United States Patent [19]
Haubner

[11] Patent Number: 5,126,940
[45] Date of Patent: Jun. 30, 1992

[54] METHOD OF AUTOMATICALLY CONTROLLING MODULATION PRESSURE IN AN AUTOMATIC TRANSMISSION INCLUDING ADDRESSING A STORED ENGINE DATA MATRIX WITH A COMBINED ADDRESS FORMED FROM BOTH DIGITIZED ENGINE SPEED AND LOAD

[75] Inventor: Georg Haubner, Berg/Oberpf, Fed. Rep. of Germany

[73] Assignee: Robert Bosch GmbH, Stuttgart, Fed. Rep. of Germany

[21] Appl. No.: 563,924

[22] Filed: Aug. 7, 1990

Related U.S. Application Data

[63] Continuation-in-part of Ser. No. 7,322,776, Mar. 3, 1989, abandoned.

[30] Foreign Application Priority Data

Mar. 3, 1989 [DE] Fed. Rep. of Germany ....... 3806844

[51] Int. Cl.⁵ .............................................. G06F 15/50
[52] U.S. Cl. .................... 364/424.1; 74/866; 74/867; 364/431.04; 364/431.12
[58] Field of Search .......... 364/424.1, 431.04, 431.05, 364/431.12; 74/866, 867

[56] References Cited

U.S. PATENT DOCUMENTS

| | | | |
|---|---|---|---|
| 4,269,281 | 5/1981 | Schneider et al. | 74/866 X |
| 4,488,456 | 12/1984 | Taga et al. | 74/866 |
| 4,494,422 | 1/1985 | Funke et al. | 74/867 |
| 4,736,301 | 4/1988 | Osanai | 364/424.1 |
| 4,781,655 | 11/1988 | Tezuka | 74/866 |
| 4,791,568 | 12/1988 | Hiramatsu et al. | 364/424.1 |
| 4,813,307 | 3/1989 | Hiramatsu et al. | 364/424.1 |
| 4,845,618 | 7/1989 | Narita | 364/424.1 |
| 4,955,259 | 9/1990 | Narita | 74/867 |
| 4,981,053 | 1/1991 | Yamaguchi | 364/424.1 X |
| 4,987,544 | 1/1991 | Honda et al. | 364/431.05 |

*Primary Examiner*—Parshotam S. Lall
*Assistant Examiner*—E. Pipala
*Attorney, Agent, or Firm*—Michael J. Striker

[57] ABSTRACT

The method of controlling the modulation pressure in an automatic transmission of a motor vehicle engine includes determining which of n types of engines is being controlled, converting a digitized measured engine load value to one of eight scaled binary values, converting a digitized measured engine speed value signal to one of 32 scaled binary values, combining the scaled binary values of both engine speed and load into an address word for addressing one of $n \times 256$ storage locations of a data storage device containing reference control data, addressing the storage location corresponding to the address word and transferring the contents of the storage location so addressed to a microprocessor, which generates a current controlling a modulation pressure valve connected to the transmission according to the predetermined engine speed and load dependent data. For greater control sensitivity, reference data is retrieved from adjacent storage locations and an interpolation of the reference data in those locations is performed.

14 Claims, 7 Drawing Sheets

FIG. 3

| P [%] | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| FULL LOAD 100% | E0 A3 | E1 83 | E2 95 | E3 94 | E4 92 | E5 89 | E6 83 | E7 81 | E8 76 | E9 74 | EA 73 | EB 69 | EC 67 | ED 65 | EE 61 | EF 58 | F0 54 | F1 53 | F2 52 | F3 51 | F4 52 | F5 53 | F6 54 | F7 55 | F8 58 | F9 63 | FA 73 | FB 82 | FC 90 | FD 108 | FE 121 | FF 127 |
| 87.5% | C0 108 | C1 108 | C2 106 | C3 103 | C4 100 | C5 95 | C6 92 | C7 86 | C8 85 | C9 83 | CA 81 | CB 78 | CC 75 | CD 71 | CE 67 | CF 64 | D0 63 | D1 61 | D2 60 | D3 61 | D4 62 | D5 63 | D6 65 | D7 67 | D8 73 | D9 80 | DA 90 | DB 108 | DC 115 | DD 135 | DE 140 | DF 140 |
| 75% | A0 125 | A1 125 | A2 123 | A3 121 | A4 118 | A5 113 | A6 111 | A7 106 | A8 105 | A9 102 | AA 100 | AB 98 | AC 96 | AD 93 | AE 90 | AF 87 | B0 86 | B1 85 | B2 84 | B3 84 | B4 85 | B5 86 | B6 89 | B7 90 | B8 93 | B9 100 | BA 108 | BB 117 | BC 122 | BD 135 | BE 150 | BF 150 |
| 62.5% | 80 141 | 81 141 | 82 140 | 83 138 | 84 135 | 85 131 | 86 129 | 87 125 | 88 124 | 89 123 | 8A 121 | 8B 119 | 8C 117 | 8D 114 | 8E 112 | 8F 110 | 90 109 | 91 109 | 92 108 | 93 105 | 94 110 | 95 111 | 96 112 | 97 113 | 98 116 | 99 122 | 9A 127 | 9B 131 | 9C 134 | 9D 140 | 9E 160 | 9F 160 |
| 50% | 60 159 | 61 159 | 62 158 | 63 157 | 64 155 | 65 151 | 66 149 | 67 145 | 68 144 | 69 142 | 6A 141 | 6B 140 | 6C 138 | 6D 135 | 6E 133 | 6F 132 | 70 131 | 71 131 | 72 131 | 73 131 | 74 132 | 75 133 | 76 135 | 77 137 | 78 140 | 79 143 | 7A 147 | 7B 152 | 7C 156 | 7D 160 | 7E 164 | 7F 168 |
| 37.5% | 40 175 | 41 175 | 42 174 | 43 172 | 44 170 | 45 166 | 46 165 | 47 164 | 48 163 | 49 162 | 4A 161 | 4B 160 | 4C 159 | 4D 157 | 4E 155 | 4F 154 | 50 154 | 51 154 | 52 154 | 53 154 | 54 155 | 55 156 | 56 156 | 57 157 | 58 158 | 59 160 | 5A 160 | 5B 160 | 5C 164 | 5D 166 | 5E 168 | 5F 171 |
| 25% | 20 189 | 21 189 | 22 189 | 23 188 | 24 188 | 25 187 | 26 185 | 27 185 | 28 185 | 29 183 | 2A 183 | 2B 182 | 2C 180 | 2D 179 | 2E 177 | 2F 176 | 30 176 | 31 175 | 32 175 | 33 175 | 34 174 | 35 174 | 36 174 | 37 174 | 38 173 | 39 173 | 3A 173 | 3B 173 | 3C 175 | 3D 177 | 3E 179 | 3F 180 |
| 12.5% 03 02 01 | 00 189 | 01 189 | 02 189 | 03 188 | 04 188 | 05 188 | 06 188 | 07 188 | 08 187 | 09 186 | 0A 183 | 0B 183 | 0C 183 | 0D 181 | 0E 179 | 0F 177 | 10 177 | 11 177 | 12 177 | 13 177 | 14 177 | 15 177 | 16 177 | 17 177 | 18 177 | 19 177 | 1A 177 | 1B 177 | 1C 177 | 1D 177 | 1E 177 | 1F 177 |
| ZERO-LOAD | 400 | 443 | 536 | 652 | 819 | 1120 | 1330 | 1680 | 1800 | 1930 | 2091 | 2277 | 2500 | 2770 | 3150 | 3534 | 3660 | 3796 | 3942 | 4099 | 4270 | 4456 | 4658 | 4880 | 5124 | 5394 | 5694 | 6029 | 6406 | 6833 | 7321 | 7884 |
| | 407 | 550 | 622 | 694 | 766 | 838 | 910 | 981 | 1053 | 1125 | 1197 | 1269 | 1341 | 1413 | 1484 | 1556 | 1628 | 1699 | 1770 | 1842 | 1914 | 1986 | 2058 | 2130 | 2201 | 2273 | 2345 | 2417 | 2489 | 2561 | 2633 | | n [min⁻¹]

$n \, [\text{min}^{-1}]$

METHOD OF AUTOMATICALLY CONTROLLING MODULATION PRESSURE IN AN AUTOMATIC TRANSMISSION INCLUDING ADDRESSING A STORED ENGINE DATA MATRIX WITH A COMBINED ADDRESS FORMED FROM BOTH DIGITIZED ENGINE SPEED AND LOAD

CROSS-REFERENCE TO RELATED APPLICATIONS

This is a continuation-in-part of application Ser. No. 322,776, filed Mar. 3, 1989 now abandoned.

BACKGROUND OF THE INVENTION

The present invention relates to a method of controlling, with the aid of a field of characteristic curves of engine variables, the modulation pressure in an automatic transmission in a motor vehicle having a hydraulic gear shift system.

The modulation pressure controls the built up hydraulic pressures for the entire operation of an automatic transmission system. Through the modulation pressure hydraulic regulating valves are controlled which change the gear shift of the automatic transmission.

In a known automatic transmission the hydraulic gear shift system is operated in dependency on engine load and road speed of the vehicle. The load and the speed are determined mechanically, namely the load is determined from the gas pedal position and the road speed by a centrifugal governor. From these variables the modulation pressure is adjusted and a suitable gear is set accordingly. This known method of controlling the modulation pressure has the disadvantage that it is inaccurate, requires too many mechanical parts and consequently is susceptible to failures.

Known is also to influence the modulation pressure by electromagnetic control valves which in turn are controlled by an electronic control circuit including one or more fields of characteristics of engine variables. In the stored fields of characteristics the engine speed and load can be used as controlling variables. To achieve a sensitive setting of the gears a large number of reference data has to be stored in the fields of characteristics. It has been devised to use a three-dimensional storage matrix or field of characteristics for controlling the modulation pressure. However, both above discussed kinds of control of the hydraulic or electromagnetic valves are very expensive especially when it is desired to provide a sensitive gear changing operation. A particularly disadvantageous feature of these known controls is the necessity to use a very large storage matrix for reference data assigned to the sets of engine variables.

SUMMARY OF THE INVENTION

It is, therefore, a general object of this invention to overcome the aforementioned disadvantage.

More particularly, it is an object of the invention to provide an improved method of controlling the modulation pressure with the aid of a control data storage means containing reference data which requires a substantially reduced number storage locations for the reference data.

Another object of the method of this invention is to reduce the cost of the controlling circuits while maintaining a very accurate and sensitive control of the modulation pressure.

Still another object of this invention is to improve the comfort of the automatic gear shifting.

According to the invention, the method of controlling the modulation pressure in an automatic transmission of a motor vehicle engine includes the steps of generating an engine load digital signal and also an engine speed digital signal according to measured values of engine speed and and engine load, converting the engine load digital signal to one of eight scaled binary values, converting the engine speed digital signal to one of 32 binary values, combining the scaled binary values of the engine load digital signal and the engine speed digital signal into a single address word for addressing one of only 256 storage locations of a reference data storage means, addressing the storage location corresponding to the single address word and transferring the contents of the storage location so addressed to the microprocessor so that the microprocessor contains the predetermined engine speed and load dependent data stored at the storage location so addressed, and determining the current controlling the modulation pressure valve according to the predetermined engine speed and load dependent data in the microprocessor.

It is of a particular advantage when the sensed engine speed is recalculated in such a manner that a set of 32 storage columns 0 to 31 of a storage matrix is assigned to an engine speed range from 400 to 2,707 rotation per minutes so that only 32 addresses are needed for this range.

It is also advantageous when the sensed engine load is recalculated so that a set of 8 binary values describe various load level ranges. Then, only 256 storage locations are necessary in the data storage means for the controlling reference data, each location containing a reference control value corresponding to a selected load range and speed range.

In another embodiment of the present invention, the data storage means has n×256 data storage locations for each of n different engine types. Thus, the data storage means contains n matrices(arrays of data), each containing 256 values of controlling reference data structured as described immediately above. In this embodiment the particular engine type must be determined prior to addressing the storage locations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a storage matrix having 32 columns of reference data assigned to different engine speed ranges, and 8 rows of reference data assigned to different engine loads;

DESCRIPTION OF THE PREFERRED EMBODIMENTS

Figure 1:
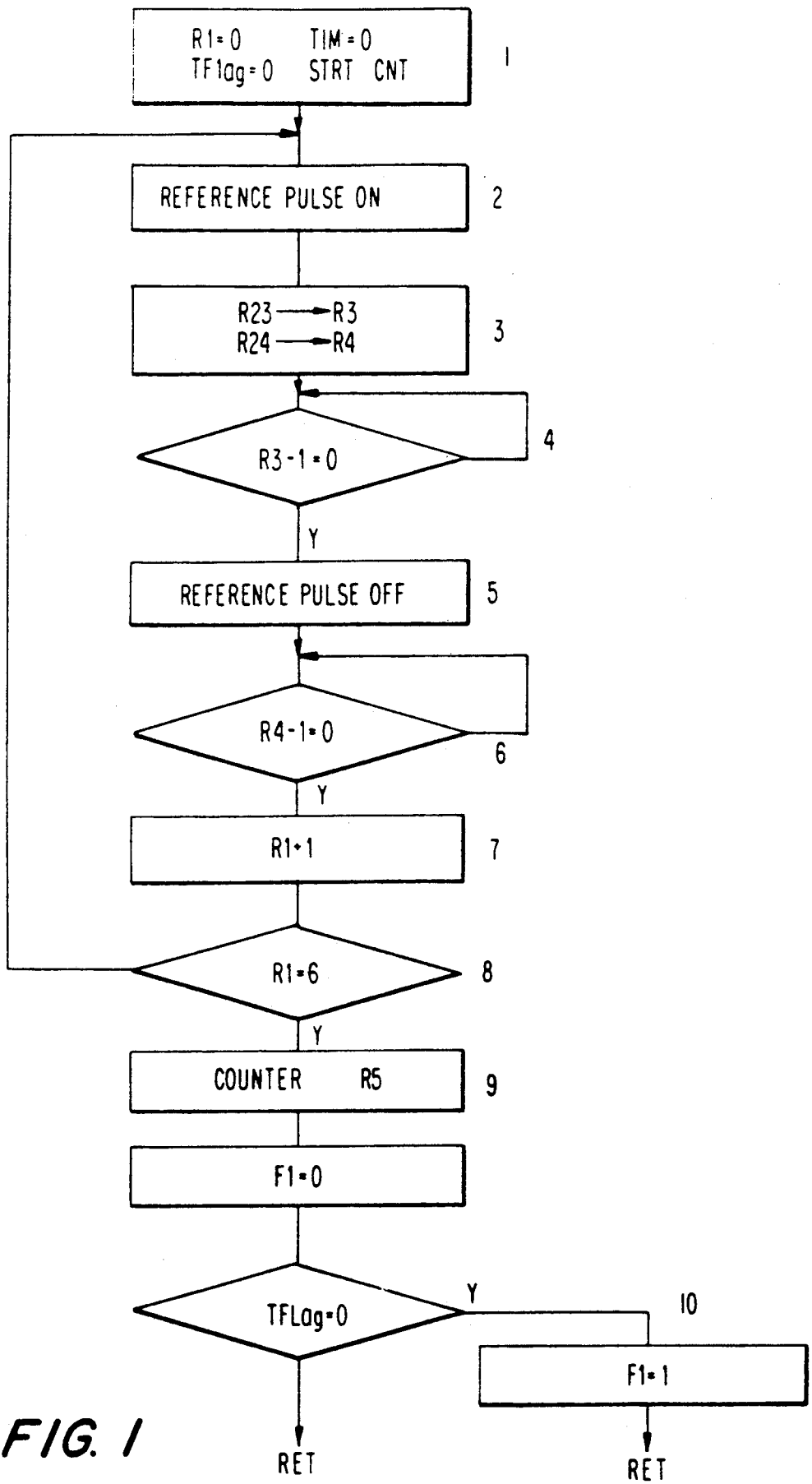
FIG. 1 is a flow chart of a program for measuring engine speed whereby corresponding speed values are stored in an engine speed register.

An essential objective of the method of the present invention is to control the modulation pressure in an automatic transmission of a motor vehicle in dependency on engine load or torque and on the engine speed in such a manner that a very exact and delicately sensitive control of the gear changing operation is made possible. As mentioned above, the more reference data, for controlling the modulation pressure are available in a data storage means, the more sensitive the gear changing operation can be. However, a huge number of reference data requires an excessive number of storage locations. In the below described method the number of storage locations is reduced through the arrangement of predetermined load dependent reference data in a data storage means and of predetermined engine speed dependent reference data in the data storage means. In the method there is a combination of sensed engine load values with engine speed values so that the result provides addresses for storage locations at intersections of the corresponding rows and columns of the data storage means. A further reduction of the number of storage locations is achieved through the determination of engine speed values by a special evaluation process.

The modulation pressure is generated by a hydraulic pressure regulator 53 (FIG. 7) which converts a supplied stream of a hydraulic liquid into a load and speed dependent pressure. The regulating stream is not continuous. In a hybrid electrohydraulic regulating circuit, a digital reference value corresponding to a pulse-interval ratio of a maximum regulating electric current is first established. For example, if electric regulating current of 840 mA is desired then the digital reference value for the pulse-interval ratio is set to 84% of a maximum regulating current of 1 A.

The pulse-interval ratio of the discontinuous regulating current depends both on the momentary engine speed N as well as on the momentary engine load P. The digital reference values for pulse-interval ratios needed for various operational conditions of the vehicle are read-out from storage matrix in the storage means 62 illustrated in FIGS. 3 and 8. The storage matrix contains 32 columns of reference data coordinated to engine speed N and 8 rows of reference data coordinated to engine load P. Accordingly, it contains 256 different storage locations for reference data according to which the pulse-interval ratio of the regulating current is determined. A 16-fold interpolation between two row (or load) reference values is made to obtain an accurate and sensitive adjustment of the regulating current and hence of the gear changing operation to the actual driving conditions. Through the 16-fold interpolation it is possible to obtain 4,096 different reference values for setting the regulating current. This amount of reference values enables a delicately sensitive setting of the modulation pressure with a relatively low number of storage locations.

The matrix illustrated in FIG. 3 contains 32 columns assigned to engine speed and 8 rows assigned to engine load, and its operation will be explained later on.

Figure 8:
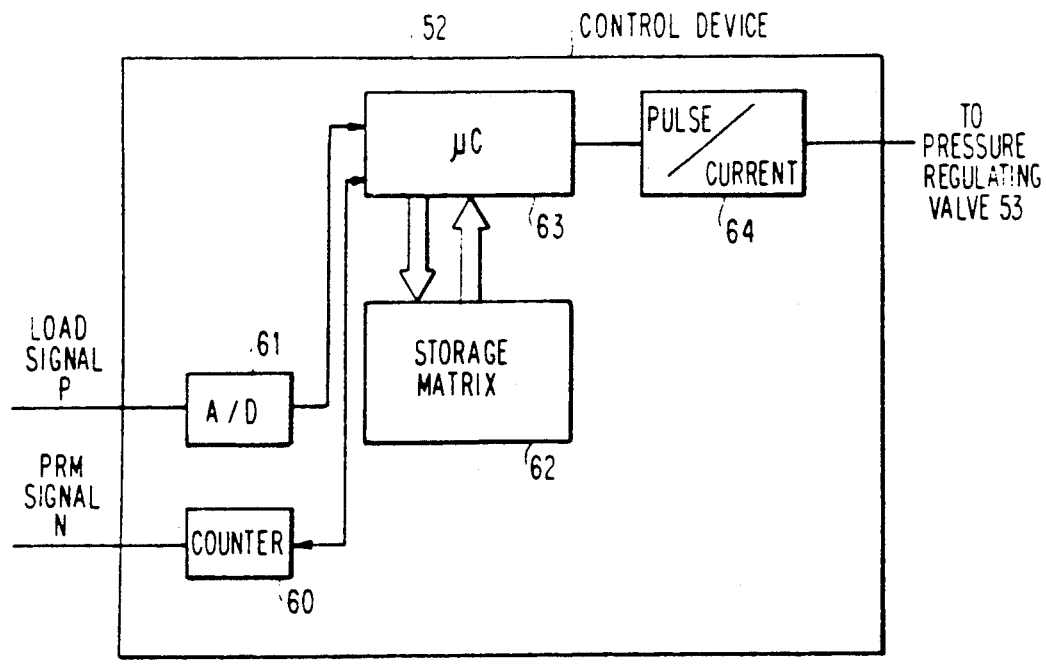
FIG. 8 is a block-circuit diagram of a control device in the apparatus of FIG. 7 for carrying out the method of the invention.
Figure 7:
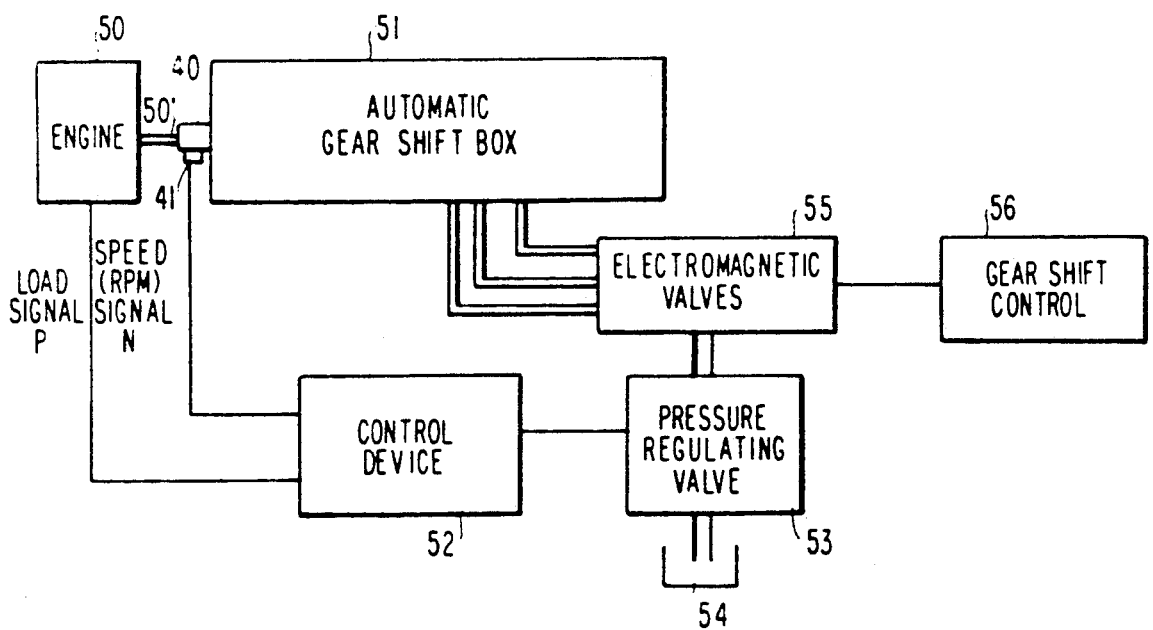
FIG. 7 is a block-circuit diagram of an apparatus for controlling the modulation pressure in an automatic transmission of a motor vehicle according to the invention.

Referring to FIGS. 1, 7 and 8 it will be explained how the engine speed values N are determined.

The engine 50 (FIG. 7) connected to the automatic transmission 51 of a motor vehicle rotates a spur gear 40 having 160 teeth, for example. The number of teeth moving within a predetermined time interval (a measuring time) past a sensor 41 is detected and stored in an engine speed register R5 of a microprocessor 63 (FIG. 8). Parallel with the engine speed measurement, the desired pulse-interval reference values are read out and fed via a convertor 64 to a hybrid electrohydraulic regulating circuit 53 as six consecutive pulse-interval ratio signals or reference pulses each lasting 15.657 ms.

In this example, counting of the teeth is performed by an electronic control circuit 52 (FIG. 8) including the microprocessor 63 which provides a read-out of the digital reference data from data storage means 62. The retrieved reference data control the regulating current for the hybrid regulator 53. The control circuit 52 is designed such that during the counting of the teeth of the spur gear it simultaneously determines by means of the microprocessor 63 and converter 64 (FIG. 8) the regulating current for the hybrid electrohydraulic regulator 53; in doing so, it sets a pulse-interval ratio corresponding to the momentary engine speed and to a previously performed measurement of the engine load. In the present method the sum of durations of the pulse-interval ratio signals is always constant. The engine speed is measured during the transmission of the 6 consecutive pulse-interval ratio signals or reference pulses.

The microprocessor 63 includes a plurality of registers, R, R' and A, a timer TIM, flag storing locations and a memory for storing the programs illustrated in the flow charts of FIGS. 1, 2, 4 and 5.

Before the start of the engine speed measurement, that is before the teeth counting process, in a first program step of the program of FIG. 1, a counting register R1, the timer TIM and a storing location TFlag of the microprocessor 63 are set to zero. Then a counter 60 (CNT) is started.

In the second program step, a reference pulse for the regulating current is switched on. While this pulse is switched on, a starting signal activates the sensor 41 cooperating with the spur gear 40 and the output signals of the sensor corresponding to the teeth of the spur gear passing the sensor are counted by the counter 60.

Figure 5:
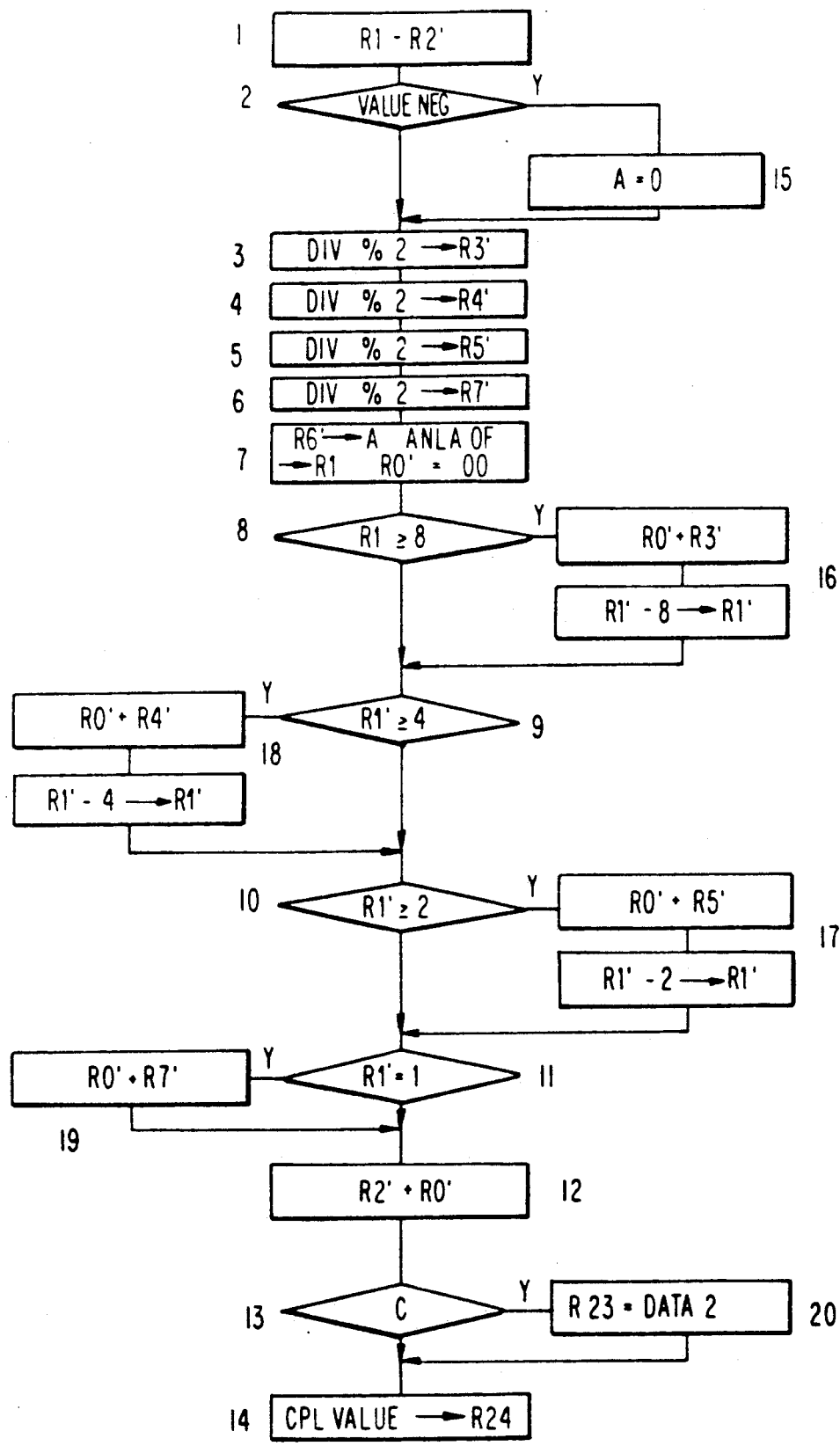
FIG. 5 is a flow chart of a program for a 16-fold interpolation of the upper and lower table values retrieved from the data storage means.

The duration of the reference pulse is controlled by a register R3 into which a starting value from an auxiliary register R23 is entered. With reference to FIG. 5 it will be explained how the starting value in the auxiliary register 23 is obtained. The register R3 is decremented by 1 until a zero value is reached. If in the fourth program step the register R3 has reached zero value then in the fifth program step, the reference pulse is switched off.

The time period during which the reference pulses are switched on and off is controlled by another decrementing or down counting register R4 whose starting value is retrieved from an auxiliary register R24. The value stored in the auxiliary register 24 corresponds to a complement of the contents of the auxiliary register R23. If in an interrogation during the sixth program step it is determined that the count in the register R4 has reached 0, then in the seventh program step the count in the counting register R1 is incremented by 1.

In the eighth program step it is tested whether the contents of the counting register R1 has reached 6. If not, the program jumps back to the second program step until 6 consecutive reference pulses are completed. If this is the case then in the ninth program step the actual count in the counter CNT is transferred as an engine speed value into the engine speed register R5 and a timer flag F1 is set to zero. If the transferred value in register 5 exceeds a maximum value, then the counter flag TFlag is set to 1.

The pulse-interval ratio is thus adjusted with the aid of the registers R3 and R4 whereby the starting values for the registers are fetched from the auxiliary registers R23 and R24. The objective of the adjustment is to guarantee that during the engine speed measuring process the pressure modulation regulator of the automatic transmission is supplied with regulating current which matches the momentary engine speed and engine load.

In the tenth program step it is determined by the counter flag TFlag whether an overflow in the counter CNT occurred, i.e. whether a maximum value of the register R5 has been exceeded.

When no overflow is present, then the program of FIG. 1 is returned (RET) to a main program whereby storing location F1 serving as a timer flag, remains set to zero. However, if an overflow of the counter CNT has occurred that means if an erroneous measurement took place, the control is returned to the main program but the flag F1 is changed to 1.

Therefore, from the value of the flag F1 it can be determined whether the engine speed measurement was errorfree or not.

The error catching routine is not limited to determining whether a maximum value of the engine speed register R5 has been exceeded. Inasmuch as the minimum engine speed must not drop below 400 rotations per minute, there is set also a minimum count for the engine speed register R5. If the actual count at the end of a measuring cycle is less than the minimum engine speed corresponding to the set minimum count, then an erroneous engine speed has been detected. This kind of error catching routine will be explained in the program flow chart of FIG. 2.

The method according to the program of FIG. 1 computes from the actual engine speed N a count M in the engine speed register R5.

For a measuring time MZ=15.657 ms, and a spur gear with 160 teeth rotating for a time period $T_{1u}$ per cycle, the count M of the counter CNT is computed according to the following formula:

$$N = \frac{MZ \cdot 160}{T_{1u}}$$

$$= 0.041752 \cdot N[min^{-1}]$$

$$= 0.015657 \cdot f[Hz]$$

From the formula it results that the counts in register R5 are between a minimum N=17 for 400 rotations per minute and a maximum N=116 for 2,707 rotations per minute. Consequently, there result 100 different count values M for this range of engine speeds N and normally 100 storing locations would be necessary. It is evident that with a larger range of engine speeds the number of storage locations and their addresses would correspondingly increase.

Figure 2:
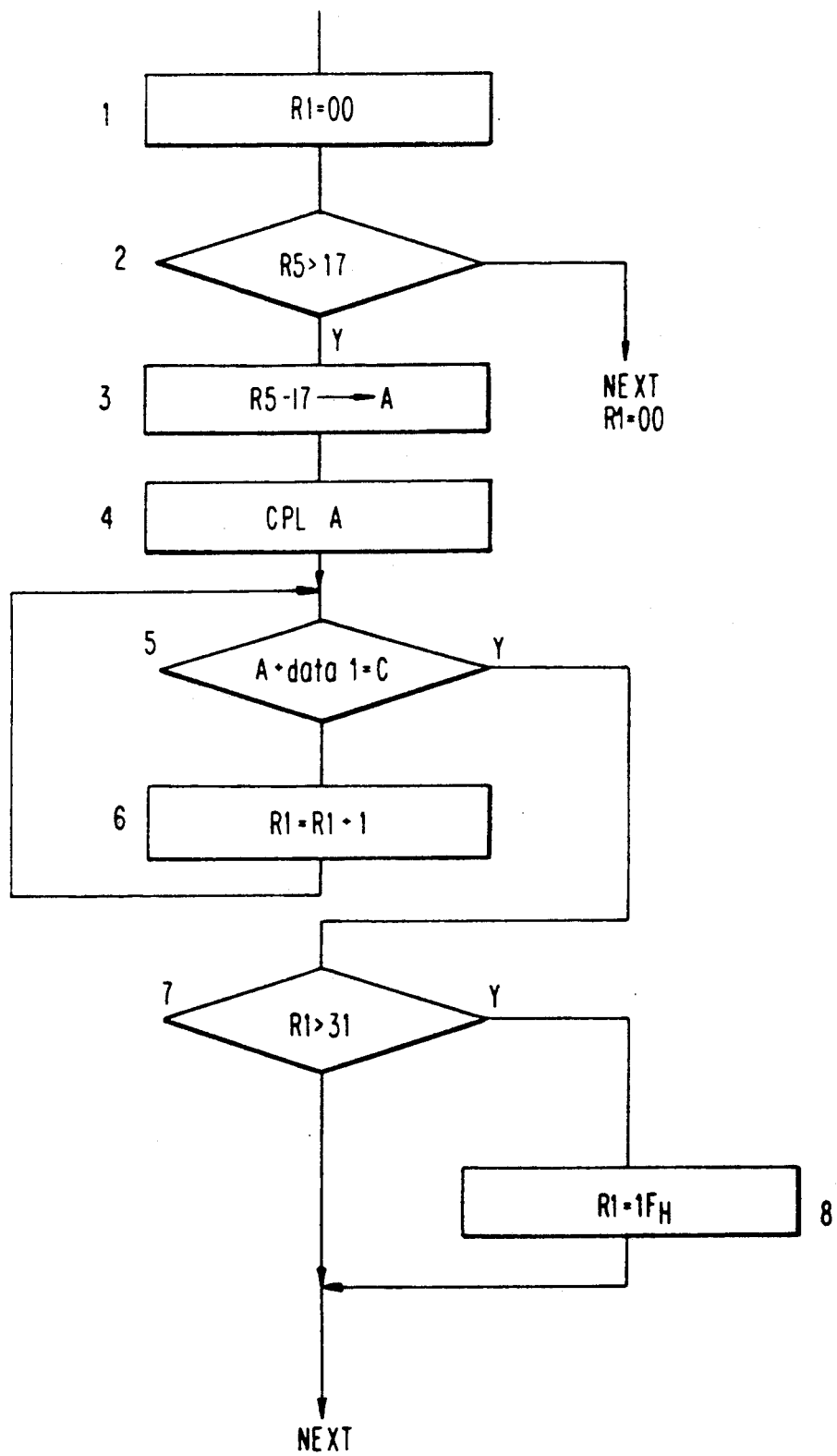
FIG. 2 is a flow chart of a program for reducing the number of storage locations of a data storage means for reference data assigned to the measured speed values.

In the flow chart of FIG. 2 it is shown how to reduce the number of storage locations for the above discussed range of engine speeds to 32 storage locations.

In FIG. 2, counting register R1 has a minimum value 0 and a maximum value 31 decimal (1F hexadecimal).

In the first program step the counting register R1 is set to 0. Subsequently, in the second program step it is tested whether the count in the engine speed register R5 falls below the allowable minimum value 17. If this is the case that means if the contents of the engine speed register R5 do not correspond to any realistic engine speed value, the processing of the count value in register R5 is interrupted, the counting register R1 is reset to 0 and the processing of the next count value is started in the engine speed register R5. When the contents of the engine speed register R5 exceed the value 17, then in the third program step the minimum value 17 is subtracted from the actual count in the register R5 and the result is stored in an accumulator A. In the subsequent fourth program step a complement CPL of the value stored in the accumulator A is computed. In the fifth program step it is tested whether an overflow or carry C would result when a fixed value "data 1" is added to the contents of the accumulator A. In this example "data 1" equals 3. The addition is repeated maximum 32 times. If an overflow or carry C results then in the subsequent seventh program step it is determined whether the count of the simultaneously running counting register R1 has exceeded the maximum value $31_d$ ($1F_H$). If not, the momentary value of the counting register R1 is assigned to the input engine speed value and subsequently the next engine speed value in the register R5 is processed.

When the momentary count of the simultaneously running counting register R1 is larger than $31_d$ ($1F_H$) then the counter R1 is set to $31_d$ and this value is assigned to the recalculated engine speed value in the register R5. Subsequently the next engine speed value is computed.

When in the fifth program step no overflow or carry C has resulted from the addition of the contents of the accumulator with the fixed value "data 1" then in the sixth program step the contents of the counting register R1 is increased by 1 and the program jumps back to test again whether after a further addition of the value "data 1" to the contents of the accumulator A an overflow or carry results. As discussed before in connection with FIG. 1, for the range of engine speed values between 400 and 2,707 rotations per minute a count value in a range between 17 and 116 count values is stored in the engine speed register R5. According to this method, 2,308 engine speed values necessitates 100 storing locations.

In the program of FIG. 2, 32 storage locations are assigned to the above range of 100 different count values, whereby a value in the engine speed register R5 always corresponds to a value of the simultaneously running counting register R1.

In FIG. 3 there is shown a field of characteristics or a storage matrix wherein the engine speed is plotted along a horizontal coordinate N (min$^{-1}$). In the matrix, an engine speed range between 400 to 2,707 rotations per minute is divided into 32 columns of storage locations for corresponding reference data. These columns correspond to the storage locations of the counting register R1.

The engine load is plotted along the vertical coordinate P which is divided into eight rows between 0% (zero load) and 100% or full load. Accordingly, the load value from one row to the next one increases by 12.5%. Altogether, FIG. 3 shows a matrix having 32 columns for the engine speed N and 8 rows for the engine load P. The individual cells or storing locations of the matrix are numbered row-wise from OO to FF hexadecimal.

In the following it will be explained how the addresses for individual reference values in the storage locations of the matrix are determined and evaluated.

Figure 4:
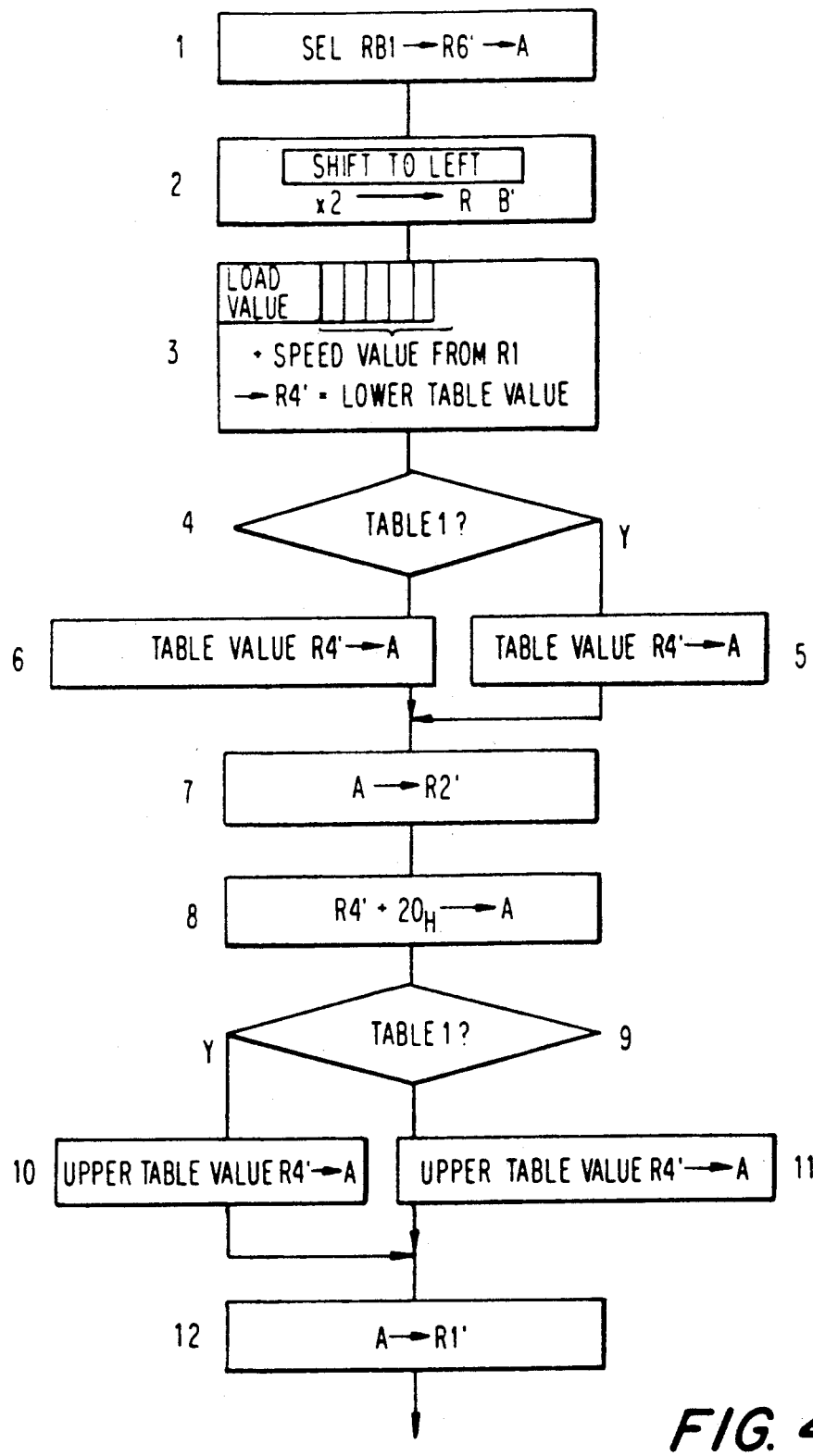
FIG. 4 is a flow chart of a program for addressing lower and upper table values of the reference data in the data storage means.

The flow chart in FIG. 4 explains how momentary engine load values are combined with engine speed values obtained according to the programs of FIGS. 1 and 2, to determine the addresses of storage locations of the matrix of FIG. 3.

To determine the momentary engine load, the travel of a non-illustrated control rod or the gas pedal position is evaluated. The larger control rod travel, the more gas is applied. The control rod travel is measured in a conventional manner to generate an analog signal which is subsequently converted by an A/D converter 61 (FIG. 8) into a digital value. The output signal of the A/D converter is a 7 digit binary number whose value amounts between 0 and $127_d$. In the first program step of FIG. 4, the output signal RB1 from the A/D converter is fed as an engine load value into the register R6'. Then it is stored in an accumulator A.

In the second program step the engine load value RB1 in the accumulator is shifted to the left, that means multiplied by 2. The five lower locations of the accumulator A are subsequently cleared in the same manner.

In the third step, the rotary speed value from the counting register R1 is read into the cleared five locations of the accumulator. The resulting number in the accumulator then corresponds to the address of a storage location in the matrix; the address is transferred into a register R4' and is assigned to a "lower table value" stored in the addressed storage location of the matrix.

In the method of this invention it is possible to employ several fields of characteristics for matrices each set up for a particular type of engine. In the next, fourth program step, the particular matrix or table to be used is selected. For example, in FIG. 4 the lower table value R4' is read out into the accumulator A which is assigned to the address number in table 1 of the register R4'. For another type of the engine, the lower table value R4' from another matrix is read out into the accumulator A. This other table value therefore pertains to another type of the engine. After the lower table value has been read into the accumulator A, in the seventh program step the value is transferred from the accumulator into a register R2'. Then in the eight program step the other number stored in the register R4' is increased by $20_H$ and the result is stored in the accumulator A and assigned to an "upper table value" stored in a storage location adjoining that of the "lower table value" in the same column. It will be seen from FIG. 3 that due to the addition of the value $20_H$ within one and the same column, the address of the second storage location corresponds to that in the next higher row and is transferred into the accumulator. Before the reference value is read out from the higher storage location, in the program steps nine to eleven it is determined from which matrix or field of characteristics the corresponding reference value is to be retrieved. In the twelfth program step the reference value read out from the appropriate matrix or field is transferred from the accumulator A into register R1'.

It will be seen from FIG. 3 that the maximum capacity of the matrix is $256_d$ ($FF_H$) storage locations. By means of the method according to FIG. 4 an upper and a lower table value within a column are read out from the matrix. Then a 16-fold interpolation between the two table values takes place which will be explained with reference to FIG. 5.

As explained before, according to the program of FIG. 4 the address for an upper table value in one column of the matrix is stored in register R1' and the address for the lower table value is stored in register R2'. In the first program step of FIG. 5 the difference between the upper and lower table values in a column of the matrix is computed. If in the second, interrogation step, it is determined that the resulting difference is not a negative number then in the third program step the difference is divided by 2 and the result is entered into the register R3'. In the subsequent program steps four to six, further divisions by 2 are performed and the results are stored in registers R4', R5' and R7'. In the seventh program step the engine load value which was previously determined from the control rod travel and stored in register R6' is transferred into the accumulator A. As explained before in regard to the program of FIG. 4, from the determined engine load value only the three uppermost bits have been used and the remaining five bits now will be employed for the interpolation. For this purpose, the load value stored in the accumulator A is added to $OF_H$ ($15_d$). The resulting sum is stored in the register R1'. In the same (seventh) program step the register R0' is cleared to 0.

In the eight program step it is tested whether the value in register R1' is larger or equal to 8. If this is not the case, in the subsequent step it is tested whether the value in the register R1' is larger or equal to 4. If the value is smaller than 5 then in the subsequent (tenth) step whether the value is larger than or equal to 2 is determined. If the value in R1' is smaller than 2 then in the twelfth step whether the value in the register R1' is equal to 1 is determined. If this condition is not fulfilled than the contents of the register R0' is added to the address for the lower table value stored in the register R2'.

In the thirteenth step it is tested whether an overflow or carry C has resulted from the above addition. If this is not the case then the complementary value CPL of the resulting sum is stored in the register R24. If a carry C has resulted from the addition then it is entered into the auxiliary register R23 as a fixed value "data 2".

As it has been explained in the program of FIG. 1, the auxiliary registers R23 and R24 contain values which are to be used for the adjustment of the desired pulse-interval reference values for the regulating current. The explanation of the program of FIG. 5 also explains that the value obtained from the interpolation determines the switch-on period of the reference pulses. Its complementary value in the auxiliary register R24 is evaluated for the adjustment of the pulse-interval ratio. In order to insure that in the case of an error the gears are not damaged, in the thirteenth step of the interpolation program of FIG. 5 a fixed value "data 2" is entered into the auxiliary register R23 when an overflow or carry C has occurred in the preceding addition. The fixed value "data 2" sets a high modulation pressure in the automatic transmission.

If in the second step of the program of FIG. 5 it is determined that the difference between the upper and lower table values is a negative number than in the fifteenth step, prior to the beginning of the interpolation, the contents of the accumulator A are cleared to 0. In this manner an erroneous starting value for the interpolation is avoided.

If the interrogation in the eight step determines that the value stored in the register R1' is larger than or equal to 8, then in the sixteenth step the values stored in registers R0' and R3' are added and the contents of register R1' are reduced by 8. The resulting difference is again stored in the register R1'.

If the interrogation in the ninth step determines that the contents of the register R1' is larger than or equal to 4 then in the eighteenth step the values stored in registers R0' and R4' are added and the contents of the register R1' is diminished by 4 and the difference is again stored in the register R1'.

If the test in the tenth step determines that the contents of the register R1' is larger than or equal to 2, then in the seventeenth step the values in registers R0' and R5' are added, the contents of R1' is reduced by 2 and the resulting difference is again stored in the register R1'.

If the interrogation carried out in the eleventh step determines that the contents of register R1' equals 1 then in the nineteenth step the contents of register R0' is added to the contents of register R7'.

Referring to the field of characteristics illustrated in FIG. 6, the interrelationship of control parameters "engine speed" and "engine load" with the modulation pressure will be explained. The shown field of characteristics was obtained from a testing run of an internal combustion engine on a test stand. The horizontal coordinate denotes the engine speed N and the vertical coordinate denotes the torque of the engine, the modulation pressure and the regulating electric current. The set of curves is plotted for different travels x of the control rod for the acceleration pedal. At the uppermost curve $X_{Max}$ a maximum torque due to maximum control rod travel results. The torque decreases with decreasing values of the curves from above downwards. The amount of the control rod travel diminishes toward the first (bottom) curve. At a high torque a high modulation pressure must build up in order to set an appropriate gear shift. In the present example the regulating electric current needed for the control of the electromagnetic valve in the hydraulic gear shift system increases curve by curve from below upwards. It will be seen that the regulating current which depends on the course of respective curves of the field, initially increases up to a central peak value wherefrom it starts decreasing.

The curves of the field are designated by variables K=0 to K=10 from the bottom upwards. The vertical dashed lines in the field are designated from the left to the right with variable values L=0 to L=10 and are spaced apart at equal intervals. The vertical dashed lines delimit with the curves of the field an array of partial areas.

In the following example, a single partial area indicated by hatched lines is designated by the following points of intersection: L=4, K=4; L=5, K=4; L=4, K=5; L=5, K=5.

Inasmuch as it is not possible to determine or compute values pertaining to all points of the field of characteristics, the measurement of the engine speed, of the torque, of the control rod travel and of the regulating electric current has been made during the test run of the engine on the stand only for a corner point of respective partial areas or windows. In this manner the engine speed, pressure, control rod travel value and the regulating electric current value can be read for a partial area. When the control of the modulation pressure intermediate values within a partial area are needed, then an interpolation process for the engine speed and the torque is performed.

After the determination of the engine speed and engine torque or load needed for the adjustment of the momentary modulation pressure, the correlated regulating electric current is determined and its reference value is stored at a corresponding address in the 32 columns and 8 rows of the storage matrix of FIG. 3. The reference value for the regulating electric current represents a digital value of the pulse-interval ratio of a maximum current which is to be supplied to the hybrid electrohydraulic regulating circuit.

Figure 6:
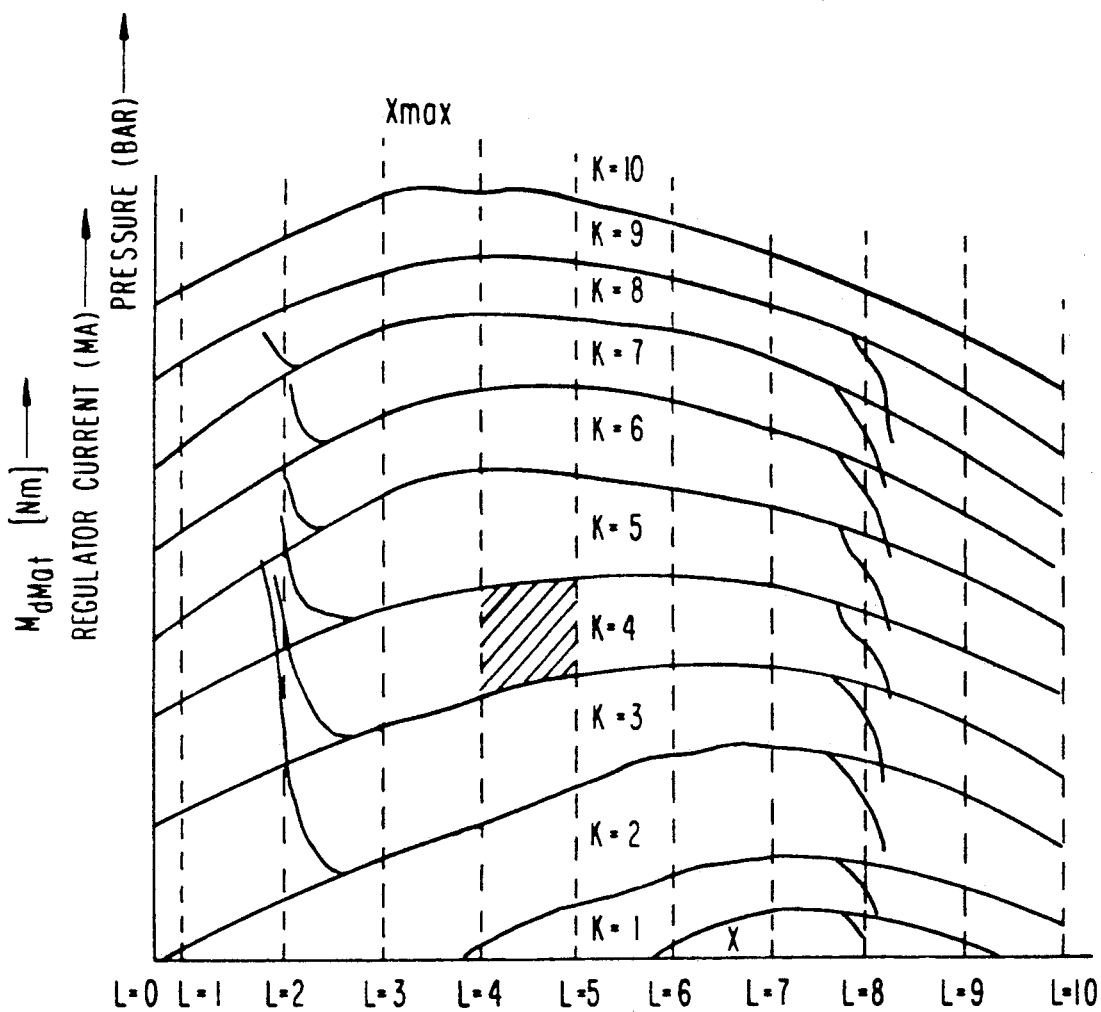
FIG. 6 is a plot of a field of characteristics of engine variables obtained on a test stand.

It is evident that the reference values or pulse-interval ratios of the electric current needed for the control of the modulation pressure can be read out both from the storage matrix of FIG. 3 or from the field of characteristics of FIG. 6. From the above description it is evident that in spite of the relatively small number of storage locations in the matrix a high number of intermediate reference values can be determined by the interpolation process and consequently the momentary gear shifts in the automatic transmission can be sensitively adjusted to momentary driving conditions.

FIGS. 7 and 8 illustrate the block circuit diagram of an example of the apparatus for controlling the modulation pressure of an automatic transmission according to the invention. Shaft 50' of the engine 50 of a vehicle is connected with an automatic gear shift box 51. An output shaft of the gear shift box 51 drives non-illustrated wheels. An analog load signal P is derived from the position of a suitable component of the engine 50, for example, from the opening of a throttle valve or from a control rod travel in the case of a diesel engine. The load signal P is applied to an electronic control device 52 illustrated in detail in FIG. 8. The engine shaft is provided with a rotary speed meter in the form of a spur gear 40 driven by the shaft 50'. A sensor 41 detects the number of teeth of the spur gear passing during a time unit. The speed signal (RPM) from the sensor is also transferred to the control device 52. The control device controls a pressure modulation regulator 53 which determines shifting pressure in the automatic gear shift box 51. By means of the pressure modulation regulator, pressure fluid from tank 54 is pumped to electromagnetic valves 55 which are controlled by a conventional gear shift control 56, known for example from the U.S. Pat. No. 4,488,456. By the actuation of an electromagnetic valve a corresponding gear is engaged in the gear shift box 51. The shifting pressure or pressure modulation in the gear shift box is determined by a pressure regulating valve in the pressure regulator 53. Referring to FIG. 8, the analog load signal P is converted in an analog-to-digital converter 61 into corresponding digital load values which are fed to an input of the microprocessor 63. The output pulses from the engine speed sensor 41 are counted in counter 60 and fed as digital values to another input of the microprocessor 63. The microprocessor processes the input digital values according to the programs explained, in FIGS. 1, 2 and 4 to provide combined addresses for the data storage means 62 (corresponding to that of FIG. 3). The data storage means, which can be in the form of an EPROM (electrically programmable read only memory), contains reference data needed for the adjustment of electric current for the pressure regulating valve in the regulator 53. As explained before in connection with FIG. 6, the reference data are determined and stored at the appropriate load- and engine speed dependent addresses of the data storage means 62 during a test run of the engine on a stand.

The microprocessor retrieves the upper and lower table values of reference data in the addressed column and performs the interpolation of the two retrieved values in accordance with the program of FIG. 5. The resulting finely adjusted digital value of the pulse-interval ratio at the output of the microprocessor 63 is converted in convertor 64 to a corresponding discontinuous electrical current for controlling the pressure regulating valve in the pressure regulator 53.

While the invention has been illustrated and described as embodied in a specific example of a method of automatically controlling modulation pressure in an automatic transmission, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of controlling a modulation pressure in an automatic transmission of a motor vehicle engine having means for converting engine load and engine speed into an engine load digital signal and an engine speed digital signal, a microprocessor connected to said means for converting so as to receive said engine load digital signal and said engine speed digital signal, reference data storage means having a plurality of storage locations, said reference data storage means containing stored predetermined engine speed and load dependent reference data in said storage locations and being connected with said microprocessor so as to be able to supply said microprocessor with said reference data from each of said storage locations and a modulation pressure regulating valve controllable by an electric current determined by said microprocessor, said method comprising the steps of combining said engine load digital signal and said engine speed digital signal in an address word for addressing one of said storage locations of said reference data storage means, addressing said storage location corresponding to said address word and transferring the contents of said storage location to said microprocessor so that said microprocessor contains said predetermined engine speed and load dependent data, and determining said current controlling said modulation pressure valve according to said predetermined engine speed and load dependent data in said microprocessor.

2. A method as defined in claim 1, wherein each of the address words consists of eight bits including a higher three bits and a lower five bits, the three higher bits being determined by the engine load digital signal and the lower five bits being determined by the engine speed digital signal.

3. A method as defined in claim 2, wherein the engine load digital signal is transferred into an 8 bit accumulator of the microprocessor and then shifted left until the lower five bits are cleared so that the load digital signal is located in the upper three bits in the accumulator to partially form the address word in the accumulator.

4. A method as defined in claim 3, wherein the engine speed digital signal is recalculated to assume a binary value equivalent to one of a predetermined 9 to $31_d$ speed ranges, and transferring the binary value of said one speed range into the lower five bits in the accumulator of the microprocessor to complete formation of the address word.

5. A method as defined in claim 4, further comprising converting said engine speed to said engine speed digital signal by providing a spur gear having teeth, said spur gear being nonrotatably attached to a drive shaft of the engine of the motor vehicle, and a sensor located adjacent said spur gear so as to be able to count the number of teeth moving by said sensor in a predetermined time interval, said sensor producing an output pulse when one of the teeth passes said sensor, by counting the output pulses from the sensor during the time interval to obtain a counted number of pulses and converting the counted number into a corresponding digital value, by storing the digital value in tan engine speed register of the microprocessor; and by recalculating the digital value in the engine speed register by adding thereto a fixed digital value.

6. A method as defined in claim 5 wherein the predetermined engine speed and load dependent reference data stored in the data storage means correspond to pulse-interval ratios of said current controlling said modulation pressure valve and are read out from the data storage means into the microprocessor during the time interval of the counting.

7. A method as defined in claim 5 further comprising the step of testing whether the value stored in the engine speed register falls below a predetermined minimum or exceeds a predetermined maximum value.

8. A method as defined in claim 5 wherein prior to the addition of the fixed digital value a complement of the value stored in the engine speed register is calculated.

9. A method as defined in claim 4, wherein the predetermined 0 to $31_d$ engine speed ranges cover, when combined, an actual speed range between 400 to 2,707 rotations per minute.

10. A method as defined in claim 1 wherein said data storage means contains only 256 of said storage locations for said predetermined engine speed and load dependent reference data, and further comprising computing intermediate values of said engine speed and load dependent reference data by interpolation between two reference data retrieved from adjoining storage locations in said data storage means and determining said current also according to said intermediate values.

11. A method as defined in claim 10 wherein said interpolation is a 16-fold interpolation.

12. A method as defined in claim 1 wherein said data storage means contains n×256 of said storage locations for said predetermined engine speed and load dependent reference data for n different types of said motor vehicle engines and said data storage means contains 256 of said predetermined engine speed and load dependent reference data for each of said n different types of said engines, and said method further comprises selecting one of said 256 of said reference data according to which of said n types of said engine is being controlled.

13. A method of controlling a modulation pressure in an automatic transmission of a motor vehicle engine having means for converting engine load and engine speed into an engine load digital signal and an engine speed digital signal, a microprocessor connected to said means for converting so as to receive said engine load digital signal and said engine speed digital signal, reference data storage means having only 256 storage locations, said reference data storage means containing stored predetermined engine speed and load dependent reference data in said storage locations and being connected with said microprocessor so as to be able to supply said microprocessor with said reference data and a modulation pressure regulating valve controllable by an electric current determined by said microprocessor, said method comprising the steps of converting said engine load digital signal to one of eight scaled binary values, converting said engine speed digital signal to one of 32 binary values, combining said scaled binary values of said engine load digital signal and said engine speed digital signal into an address word for addressing one of said 256 storage locations of said reference data storage means, addressing said storage location corresponding to said address word and transferring the contents of said storage location to said microprocessor so that said microprocessor contains said predetermined engine speed and load dependent data stored at said storage location, and determining said current controlling said modulation pressure valve according to said predetermined engine speed and load dependent data in said microprocessor.

14. A method of controlling a modulation pressure in an automatic transmission of a motor vehicle engine having means for converting engine load and engine speed into an engine load digital signal and an engine speed digital signal, a microprocessor connected to said means for converting so as to receive said engine load digital signal and said engine speed digital signal, reference data storage means having only $n \times 256$ storage locations for n types of said motor vehicle engines, said reference data storage means containing stored predetermined engine speed and load dependent reference data for each of said engine types in said $n \times 256$ storage locations and being connected with said microprocessor so as to be able to supply said microprocessor with said reference data and a modulation pressure regulating valve controllable by an electric current determined by said microprocessor, said method comprising the steps of determining which of said n types of said motor vehicle engines is being controlled, converting said engine load digital signal to one of eight scaled binary values, converting said engine speed digital signal to one of 32 scaled binary values, combining said scaled binary values of said engine load digital signal and said engine speed digital signal into an address word for addressing one of said 256 storage locations for said n type of said engine being controlled, addressing said storage location corresponding to said address word and transferring the contents of said storage location to said microprocessor so that said microprocessor contains said predetermined engine speed and load dependent data stored at said storage location, and determining said current controlling said modulation pressure valve according to said predetermined engine speed and load dependent data in said microprocessor.

* * * * *